United States Patent [19]

Malkieli et al.

[11] Patent Number: 5,013,972
[45] Date of Patent: May 7, 1991

[54] DUAL-POWERED FLICKERING SYMBOLIC OR RELIGIOUS LIGHT (ELECTRONIC YAHRZEIT)

[75] Inventors: Moshe Malkieli; Israel Apel, both of Bnei Braq, Israel

[73] Assignee: Samuel Kaner, Tel Aviv, Israel; a part interest

[21] Appl. No.: 212,898

[22] Filed: Jun. 29, 1988

[51] Int. Cl.$^5$ .............................................. H05B 41/36
[52] U.S. Cl. .......................... 315/209 R; 315/200 A; 362/806; 362/800; 362/183
[58] Field of Search ................... 315/200 A, 153, 195, 315/317, 209 R, 210, 217; 362/351, 362, 806, 186, 183, 202, 392, 800; 340/985; 331/111

[56] References Cited

U.S. PATENT DOCUMENTS

| | | | |
|---|---|---|---|
| 2,916,670 | 12/1959 | Pederson | 315/200 A |
| 3,986,144 | 10/1976 | Russo | 315/200 A |
| 4,314,198 | 2/1982 | Rogers | 315/200 A |
| 4,384,317 | 5/1983 | Stackpole | 362/183 |
| 4,626,852 | 12/1986 | Dodge | 340/985 |

Primary Examiner—Eugene R. LaRoche
Assistant Examiner—Ali Neyzari
Attorney, Agent, or Firm—Samuel Shipkovitz; Edward Langer

[57] ABSTRACT

An eternal symbolic/religious memorial light having a flickering-candle appearance generated electronically by at least a pair of lamps and operated by a rechargeable battery charged/recharged by a solar cell unit, or by the solar cell unit itself. In an alternative embodiment, a light-dependent resistor (LDR) is incorporated to automatically adjust the current to the lamps in accordance with the background lighting conditions. Thus, the flickering appearance is made brighter during daylight when this is required in order to see the candle, and at nightfall, the brightness is diminished as the candle is more easily visible. In another alternative embodiment, the solar cells continuously run a user-programmed calendar/timer to turn on the lamp units only on specified memorial/anniversary days.

11 Claims, 5 Drawing Sheets

DUAL-POWERED FLICKERING SYMBOLIC OR RELIGIOUS LIGHT (ELECTRONIC YAHRZEIT)

FIELD OF THE INVENTION

The present invention relates to flickering symbolic or religious lamps such as eternal memorial lights, for use in memory of deceased loved ones and includes an image of a candle and simulates the appearance of a candle by providing a flickering light or pseudo-flickering light appearance.

BACKGROUND OF THE INVENTION

Many religions of the world recognize a symbolic burning candle either burnt on a continuous year-round basis, the so-called eternal lamp, or on a 24-hour, once-a-year (anniversary of a beloved's date of death) basis [American Judaism's Yahrzeit]. In either case, the purchase of such timed candles for the latter or continuous fuel source for the former is a logistical problem. In some cases, this symbolic candle is placed on the tombstone of the gravesite and must be visible, if only slightly, against a daylight background.

It is believed that a flickering candle has been simulated in appearance successfully in the prior art by either an alternately switched-on bulb, or, more successfully, by two lamp bulbs or electrically lit elements very near each other where each bulb or the like is alternately on when the other is off and vice versa, with this sequence repeated continuously with each on-time being in the half-second or so range. In the case of an eternal light such a lamp unit could not be continuously run with a mere battery as the unit would soon go out due to lack of infinite energy.

While the concept of having an independent solar-operated rechargeable battery system operating a lamp on a continuous year-round basis is shown in U.S. Pat. No. 4,626,852 and in U.S. Pat. No. 4,314,198, there is no indication of an eternal light application which is simulated by flickering lamp units.

Thus, it would be desirable to provide an eternal light simulating a flickering candle, visible even in broad daylight.

SUMMARY OF THE INVENTION

Accordingly, it is a principal object of the present invention to overcome the above-mentioned difficulties and provide an eternal light having a flickering-candle appearance generated electronically and operated by a rechargeable battery charged/recharged by a solar cell unit, or by the solar cell unit itself.

In accordance with a preferred embodiment of the invention, there is provided a dual-powered "flickering" symbolic/religious light simulating an eternal operating candle comprising:

at least one solar cell unit for recharging an electrical energy source; and a flip-flop means driven by at least one of said solar cell unit and said electrical energy source, said flip-flop means having a pair of cells each containing a time constant means, a lamp and a transistor/gated switch, said lamp in each cell being connected in an output switching path of said transistor/gated switch thereof, wherein each time constant means in said cell pair is connected so as to determine a gating ON and OFF cycle of said transistor/gated switch in said other cell, each said time constant means having a time constant in the fraction of a second range to thereby cause said lamps to be alternatingly ON to continuously simulate a flickering appearance of an operating candle.

In the preferred embodiment, the invention herein contemplates that the batteries to power the lamp unit would be of the rechargeable type and that the recharging would be done by means of an associated solar photovoltaic cell panel generator that would feed current into the batteries while in the presence of either natural or artificial light and the batteries would merely be drained during the absence of natural or artificial light from the solar cell generator.

Thus, the simulated flickering candle would appear to run eternally (or in reality until the rechargeable batteries chemically deteriorated preventing further functional use).

In an alternative embodiment, a light-dependent resistor (LDR) is incorporated to automatically adjust the current to the lamps in accordance with background lighting conditions. Thus, the flickering appearance is made brighter during daylight when this is required to enhance visibility, and at nightfall, the brightness is diminished as the candle is more easily visible.

In the American Yahrzeit embodiment, the solar cells could continuously run a user-programmed calendar/timer to turn on the lamp unit on days of the anniversaries of death of the beloved of the members of the household and then turn off the unit the next day (actually, for example, to turn-on at the sundown time of one day and turn-off at the sundown time of the next day).

An advantage of the invention is the ability thereof to function perpetually, indoors and outdoors, independently of variation of weather or lighting conditions because of the backup power source/batteries provided for the solar cell generator.

Other features and advantages of the invention will become apparent from the drawings and the description contained herein.

BRIEF DESCRIPTION OF THE DRAWINGS

For a better understanding of the invention, reference is made to the accompanying drawings in which like numerals or symbols designate corresponding elements or sections throughout, and in which.

DETAILED DESCRIPTION OF THE PREFERRED EMBODIMENTS

As stated above, the purpose of the invention is to have an electronic symbolic or religious lamp simulating a flickering candle and operated by the energy of a rechargeable battery/solar cell unit generator system. A typical embodiment could be in the form of an eternal memorial light, for use in memory of deceased loved ones.

Figure 1:
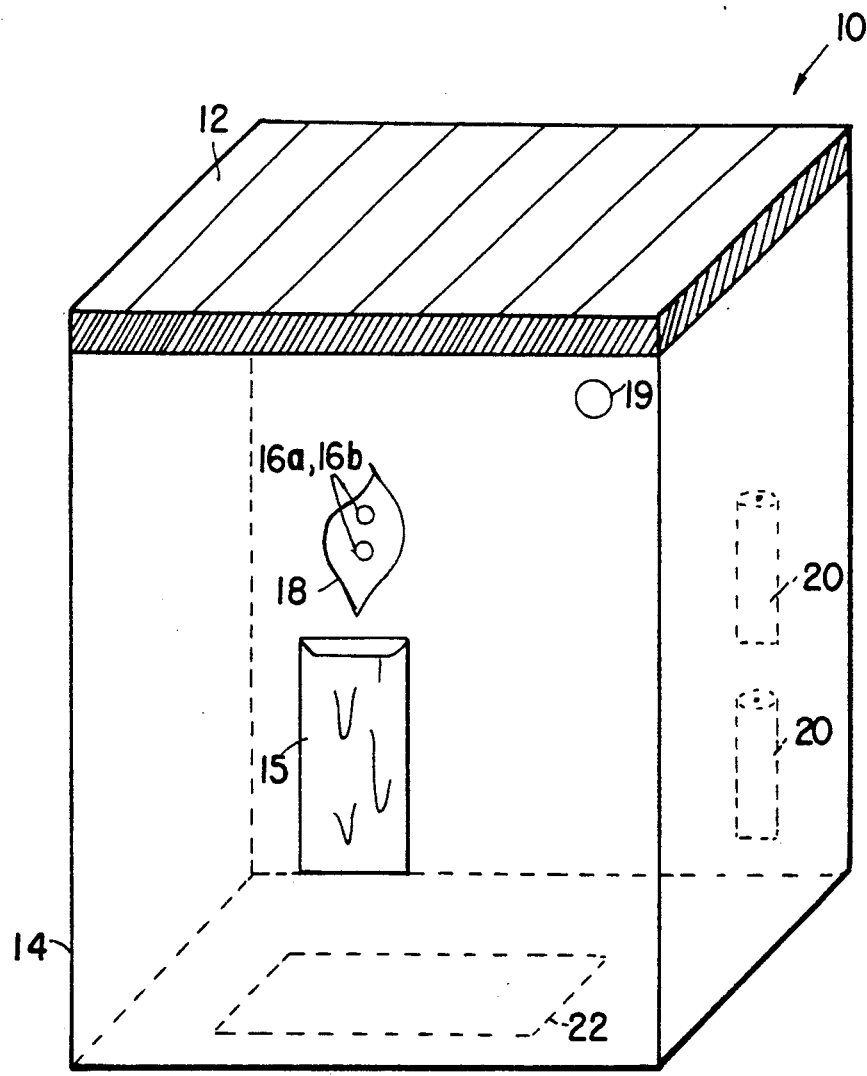
FIG. 1 is a view of the general physical appearance of the invention.

A general physical appearance of a preferred embodiment of the invention is shown in FIG. 1, configured as an eternal light 10. A solar cell panel 12 is positioned at or near the top of a housing 14, which may be formed of a sturdy plastic material. The outline of a candle symbol 15 may be engraved on a front side of housing 14. The flickering candle appearance is provided by two side-by-side lamps or LEDs 16a, 16b, which may be seated in an opening of housing 14 behind a cover 18 provided by a piece of transparent plastic, e.g. having an amber tint. A light-dependent resistor (LDR) 19 is mounted in an opening in housing 14 for use in an alternative embodiment (see FIG. 4).

In accordance with the operation of the present invention, the solar cells 12 provide charging current for backup rechargeable batteries 20, which cooperate with the electronics on circuit board 22 to safely charge the rechargeable batteries 20 as well as prevent overcharging. Additionally, the power from either solar cell unit 12 or batteries 20 provides the logic, using a flip-flop configuration to alternately light each of the two lamps 16a, 16b.

Thus, one of lamps 16a, 16b is momentarily lit while the other lamp is off and this sequence is alternated so that each lamp is alternated both ON and OFF while the other lamp is alterated both OFF and ON, respectively, with this cycle repeated at a frequency sufficiently high to convey the appearance of the operation of the two closely located lamps as that of a flickering candle. The time of each ON or OFF is approximately less than ⅛ to ½ second. (Avoidance of the undercharging problem is accomplished by using nickel-cadmium type rechargeable batteries). The power, whether from solar cells 12 or batteries 20, causes a flip-flop circuit or functional equivalent, for example, as shown in FIGS. 2 and 3, to alternate states in an astable manner, thereby causing LED lamps 16a–b, or equivalent, to alternate between ON and OFF conditions and thus to simulate the flickering of a candle.

Figure 2:
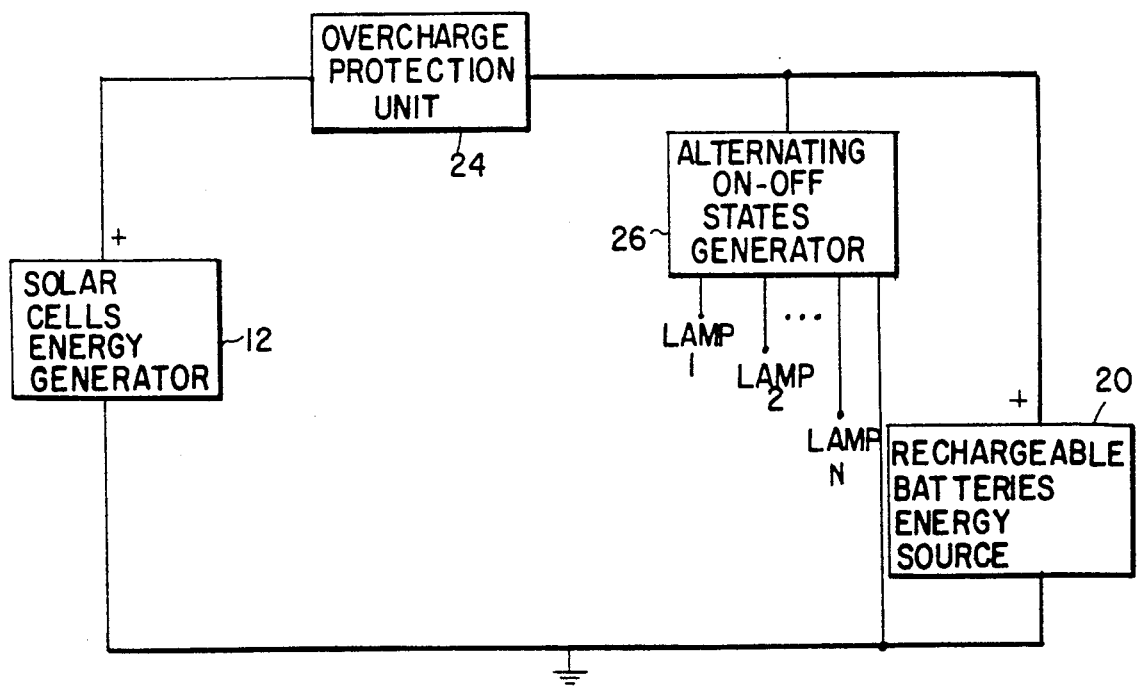
FIG. 2 is a functional diagram of a first embodiment.

FIG. 2 is a functional equivalent of the electronics of the invention, showing an overcharge protection unit 24 and alternating on-off states generator 26 (flip-flop). It is contemplated that repeated alternation of ON-OFF conditions of three lamps or more is within the scope of this invention (one in the ON state with the others in the OFF state).

Figure 3:
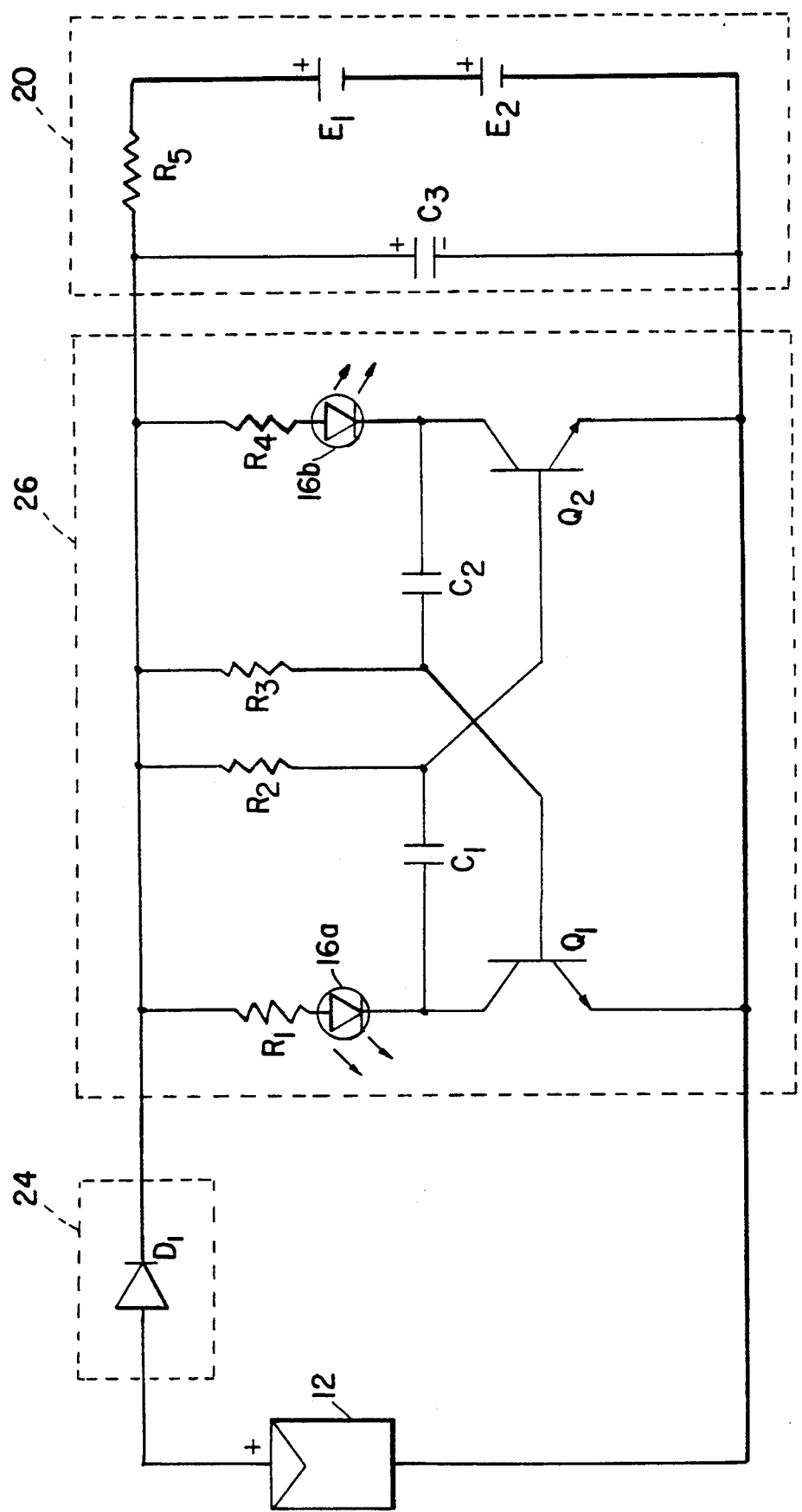
FIG. 3 is the circuit diagram of a first embodiment.

FIG. 3 is an embodiment of the electronics for a two-lamp, two alternating states circuit of the invention. In FIG. 3 note that overcharge protection unit 24 is a germanium diode D1 whose purpose is to prevent overcharging of the rechargeable batteries 20 by the solar cell unit 12. This is accomplished by the reverse-bias applied to diode D1 when the battery voltage 20 exceeds that of solar cell unit 12. Otherwise, it is forward-biased.

Alternating on-off states generator 26 is provided by a standard configuration of a 2-state flip-flop circuit, with the configuration of parts having the following suggested values:

| | | | |
|---|---|---|---|
| R1, R4 = | 390 ohm | D1 = | 1N367, or equiv. |
| R2, R3 = | 68 kohm | Q1, Q2 = | 2N2222 (NPN) |
| R5 = | 20 ohm | solar cells 12 = | 3.5 volt, 18 ma |
| C1, C2 = | 2.2 uf, 6v | LEDs 16a, 16b = | HLMP 4700 |
| C3 = | 2.2 uf, 6v | E1, E2 = | 1.25 v ni-cad batt. ea. |

Lamp 16a is at the collector side of the left cell of the flip-flop with lamp 16b at the collector side of the right cell of the flip-flop. The ON/OFF time is determined by the R (2, 3) C (1, 2) time constant. Thus, the left lamp 16a will be lit when the right lamp 16b is OFF and vice versa, repeatedly. Resistor R5 is merely a current limiting resistor.

Flip-flop multivibrators are discussed in such electronics books as Basic Electronics for Scientists, Third edition, by James J. Brophy, McGraw-Hill, N.Y. 1977 at p. 274. As will be recognized by those skilled in the art, the invention contemplates the use of an IC chip design for the circuitry.

Figure 4:
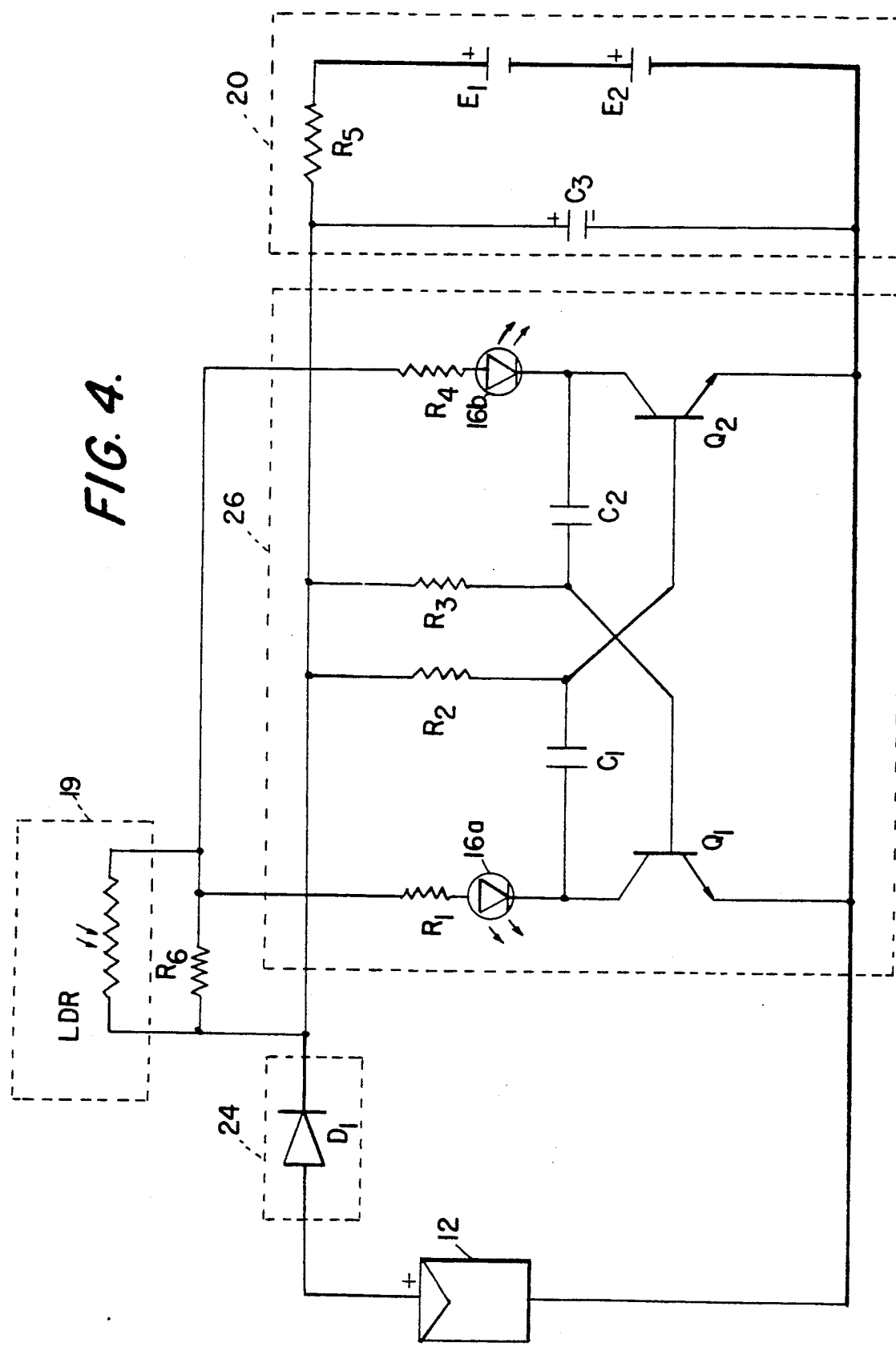
FIG. 4 is the circuit diagram of a second embodiment incorporating brightness adjustment means for background lighting conditions.

FIG. 4 shows an alternative embodiment of the invention in which a light-dependent resistor 19 (LDR) has been added as shown to adjust the current to lamps 16a, 16b in accordance with the amount of background light. This modification enables automatic control of the brightness of lamps 16a–b, for conditions of daylight or darkness. Thus, in daylight, the brightness is increased, to maintain the flickering appearance visible, while at nightfall it is decreased, maintaining visibility yet conserving battery 20 energy. Typical values are R6=1200 ohm, LDR=2322-600-93002 (Philips type) and modified values for R1, R4=220 ohm.

Figure 5:
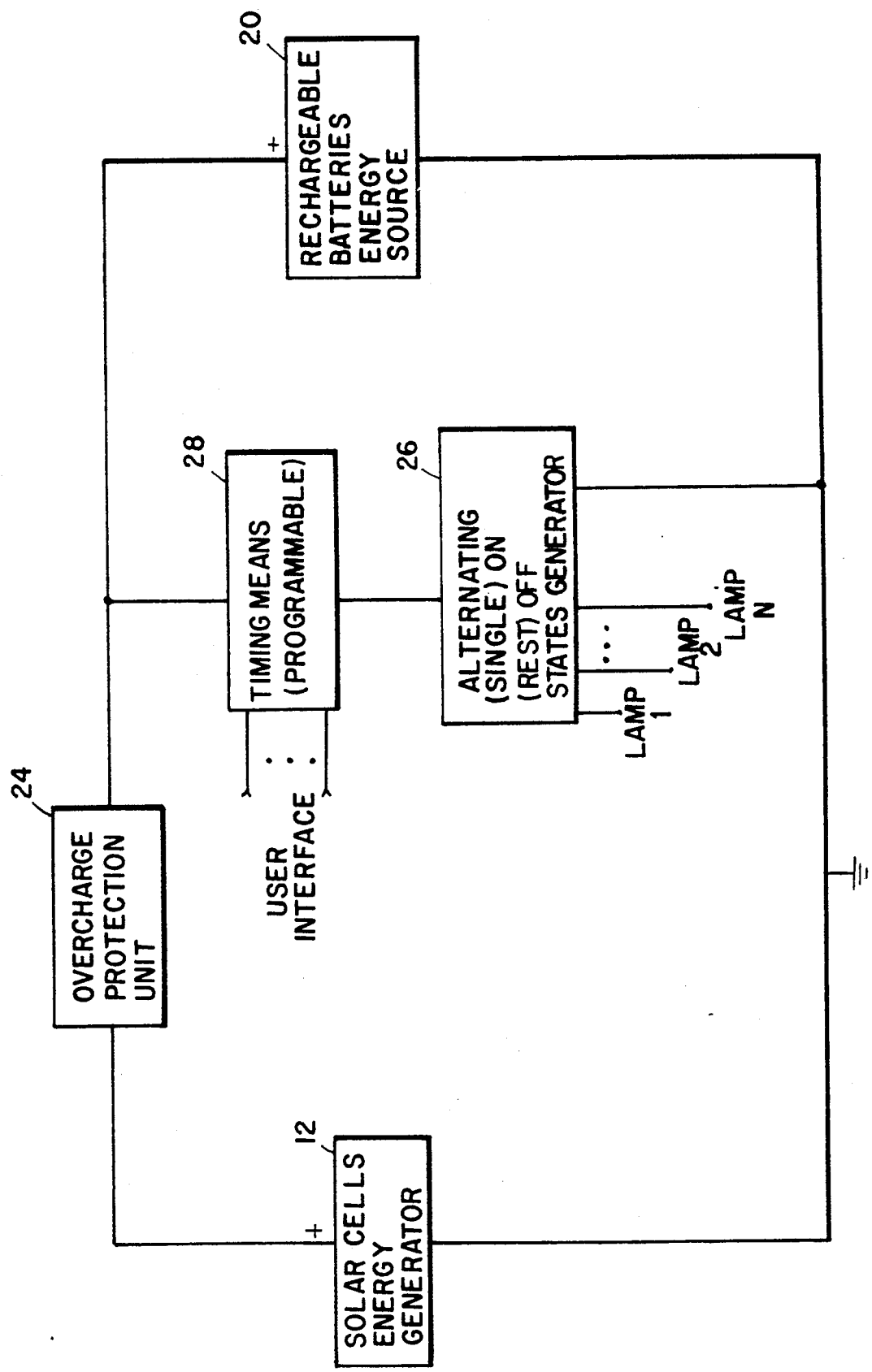
FIG. 5 is a functional diagram of a third embodiment incorporating a programmable timer for use at specified times.

FIG. 5 shows another alternative embodiment (American Yahrzeit embodiment) in which a programmable timing means 28, a counter or possibly a microprocessor, is included to allow the solar cells to continuously run a user-programmed calendar/timer. This embodiment will function by turning on lamps 16a–b on days of the anniversaries of death of the beloved of the members of the household, and will turn off the unit the next day (actually, for example, to turn-on at the sundown time of one day and turn-off at the sundown time of the next day).

In summary, the present invention provides a compact, long-lasting and efficient solution for an eternal memorial candle which requires little or no maintenance and satisfies a recognized religious/symbolic need of many faiths.

Having described the invention in connection with certain specific embodiments thereof, it is to be understood that the description is not meant as a limitation since further modifications may now suggest themselves to those skilled in the art and it is intended to cover such modifications as fall within the scope of the appended claims.

We claim:

1. A flickering symbolic religious light simulating an operating candle comprising:
   a photovoltaic cell unit having a first terminal and a secod terminal;
   a rechargeable electrical energy source having a first terminal and a second terminal;
   an overcharge protection unit having a first terminal and a second terminal;
   said first terminal of said overcharge protection unit being connected to said first terminal of said photovoltaic cell unit;
   said second terminal of said protection unit being connected to said first terminal of said rechargeable electrical energy source;
   said second terminal of said rechargeable source being connected to said second terminal of said cell unit, wherein said first terminal of said protection unit is (a) passing current to said second terminal of said protection unit while a voltage at said first terminal of said protection unit is greater than a voltage at said second terminal of said protection unit, and (b) is not passing current otherwise;

a 2-cell flip-flop means having a left cell, a right cell, a first terminal, and a second terminal;

each of said cells having a time constant means, a lamp, and a transistor/gated switch; each of said lamps being in an output switching path of each said switch; each said time constant means of each of said cells being connected between said first terminal of flip-flop means and a gate of said transistor/gated switch of said other cell; said time constant means of each cell determining a gating-OFF time of said switch of said other cell;

wherein said first terminal of said flip-flop means is connected to said first terminal of said rechargeable electrical energy source; said second terminal of said flip-flop means is connected to said second terminal of said rechargeable electrical energy source;

a housing enclosing said lamps and having at least one flickering candle appearance opening and at least one candle symbol; said photovoltaic cell unit being mounted atop said housing; each lamp of said cell pair being located so as to be proximate the other lamp and viewable through said opening; and each said time constant means has a time constant in the fraction of a second range to thereby cause said lamps to be alternatingly ON to continuously simulate a flickering appearance of an operating candle.

2. The invention of claim 1 wherein said electrical energy source comprises at least one rechargeable nickel cadmium batteries.

3. The invention of claim 1 wherein said lamps comprise a set of LEDs.

4. The invention of claim 1 wherein said time constant means and transistor/gated switch of each of said cells comprise an integrated circuit.

5. The invention of claim 1 wherein said overcharge protection unit comprises a diode which is forward-biased while said photovoltaic cell unit voltage is greater than said rechargeable electrical energy source output voltage, and is reverse-biased otherwise.

6. The invention of claim 1 further comprising light-sensitive current regulating means for adjusting the brightness of said flickering lamps during said gating ON cycle in accordance with an associated background lighting condition.

7. The invention of claim 1 further comprising user-interfaceable timing means having a programmed time ON unit causing operation of said flip-flop means in accordance with a program establishing a desired calendar period of operation.

8. The invention of claim 1 wherein said programmed timing ON unit comprises a microprocessor.

9. A method of operating a dual-powered flickering symbolic/religious light for simulating an operating candle comprising the steps of:

providing at least one solar cell unit for recharging an electrical energy source;

driving a flip-flop means by at least one of said solar cell unit and said electrical energy source;

said flip-flop means having a pair of cells each containing a time constant means, a lamp, and a transistor/gated switch, said lamp in each cell being connected in an output switching path of said transistor/gated switch thereof, wherein each time constant means in said cell pair is connected so as to determine a gating ON and OFF cycle of said transistor/gated switch in said other cell;

protecting said electrical energy source from overcharging by said solar cell unit by
  (a) allowing current passage from said solar cell unit while an output voltage thereof is greater than an output voltage at said rechargeable electrical energy source, and
  (b) not allowing current passage otherwise;

providing a housing enclosing said lamps and having thereon at least one flickering candle appearing opening, said solar cell unit being mounted atop said housing, each lamp of said cell pair being located so as to be proximate the other lamp and viewable through said opening, each said time constant means having a time constant in the fraction of a second range to thereby cause said lamps to be alternatingly ON to continuously simulate a flickering appearance of an operating candle; and placing said light in an area in association with commemorating a deceased.

10. The method of claim 9 further comprising the step of automatically adjusting the brightness of said flickering lamps during said gating ON cycle in accordance with an associated background lighting condition.

11. The method of claim 9 further comprising the step of programming the operation of said flip-flop means in accordance with a program establishig a desired calendar period of operation.

* * * * *